(12) United States Patent
Ishihara et al.

(10) Patent No.: US 9,228,913 B2
(45) Date of Patent: Jan. 5, 2016

(54) ELECTROSTATIC PRESSURE SENSOR

(71) Applicant: Azbil Corporation, Tokyo (JP)

(72) Inventors: Takuya Ishihara, Tokyo (JP); Hidenobu Tochigi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 14/141,654

(22) Filed: Dec. 27, 2013

(65) Prior Publication Data

US 2014/0182386 A1 Jul. 3, 2014

(30) Foreign Application Priority Data

Dec. 27, 2012 (JP) ................................. 2012-284704

(51) Int. Cl.
  *G01L 9/12* (2006.01)
  *G01L 9/00* (2006.01)
  *G01L 19/06* (2006.01)
(52) U.S. Cl.
  CPC ........... *G01L 9/0073* (2013.01); *G01L 19/0627* (2013.01)
(58) Field of Classification Search
  CPC .................................................... G01L 9/0073
  USPC .................................................... 73/756, 754
  See application file for complete search history.

(56) References Cited

U.S. PATENT DOCUMENTS

| | | | |
|---|---|---|---|
| 4,790,192 A * | 12/1988 | Knecht et al. ................... | 73/721 |
| 6,443,015 B1 | 9/2002 | Poulin et al. | |
| 6,904,808 B2 | 6/2005 | Masuda | |
| 6,993,973 B2 * | 2/2006 | Lischer et al. ................... | 73/724 |
| 7,703,329 B2 * | 4/2010 | Sekine et al. ................... | 73/754 |
| 2004/0007071 A1 | 1/2004 | Masuda | |
| 2008/0245154 A1 | 10/2008 | Sekine et al. | |

FOREIGN PATENT DOCUMENTS

| | | |
|---|---|---|
| JP | 2002-111011 A | 4/2002 |
| JP | 2006-3234 A | 1/2006 |
| JP | 2011-149946 | 8/2011 |
| KR | 2002-0033173 | 5/2002 |

OTHER PUBLICATIONS

Korean Office Action dated Nov. 12, 2014, which issued during prosecution of Korean Application No. 10-2013-0164163, which corresponds to the present application.

* cited by examiner

*Primary Examiner* — Lisa Caputo
*Assistant Examiner* — Tran M Tran
(74) *Attorney, Agent, or Firm* — Troutman Sanders LLP

(57) ABSTRACT

An electrostatic pressure sensor has a supporting diaphragm bonded to be held between first and second pedestal plates, a sensor chip supported on a top face of a center portion of the second pedestal plate. The supporting diaphragm has in the center portion thereof a large-diameter hole that forms a slit-shaped space between the first and second pedestal plates. The first pedestal plate has at least one inlet hole, for the fluid being measured, connecting to the slit-shaped space. The second pedestal plate has at least an outlet hole, connecting to the slit-shaped space, for directing the fluid being measured to the pressure-sensitive diaphragm of the sensor chip. The pedestal plate has an inlet hole of the first pedestal plate and an outlet hole of the second pedestal plate do not overlap each other in the direction of thickness of the first and second pedestal plates.

1 Claim, 5 Drawing Sheets

Background Art

ELECTROSTATIC PRESSURE SENSOR

CROSS REFERENCE TO RELATED APPLICATION

This application claims priority under 35 U.S.C. §119 to Japanese Patent Application No. 2012-284704, filed on Dec. 27, 2012, the entire content of which being hereby incorporated herein by reference.

FIELD OF TECHNOLOGY

The present invention relates to an electrostatic pressure sensor that detects, as a change in electrostatic capacitance, a change in a pressure sensitive diaphragm that flexes when it bears the pressure of a fluid being measured.

BACKGROUND

Conventionally, electrostatic pressure sensors for detecting, as a change in electrostatic capacitance, a change in a pressure sensitive diaphragm that flexes when it bears the pressure of a fluid being measured have been widely known. For example, electrostatic pressure sensors are used for measuring the state of vacuum in a manufacturing process such as in semiconductor manufacturing equipment, where the electrostatic pressure sensor for measuring the vacuum state is known as a vacuum gauge.

This vacuum gauge has a housing that has an inlet portion for the fluid that is to be measured, and the change in the pressure-sensitive diaphragm that flexes when it bears the pressure of the fluid being measured that has been introduced through the inlet portion of the housing is detected as a change in electrostatic capacitance. In the vacuum gauge, a baffle for preventing the accumulation, on the diaphragm, of substances that are included in the fluid being measured and that are unnecessary and that are an impediment (where these substances shall be known as "contaminating substances") is provided between the inlet portion and the pressure-sensitive diaphragm, with a plate face thereof perpendicular to the direction through which the fluid being measured flows.

FIG. 5 illustrates the critical portions of a vacuum gauge shown in Japanese Unexamined Patent Application Publication No. 2006-3234 ("the JP '234"). In this figure, 100 is a sensor chip, and is supported on the center portion of the top face of a pedestal plate 101. The pedestal plate 101 is made from a first pedestal plate 102 and a second pedestal plate 103, which are bonded to the top and bottom faces of a supporting diaphragm 104, where the peripheral portion of the supporting diaphragm 104 is bonded held between a lower housing 105 and an upper housing 106. That is, only the peripheral portion of the supporting diaphragm 104 is bonded between the lower housing 105 and the upper housing 106 in a state wherein the supporting diaphragm 104 is held between the first pedestal plate 102 and the second pedestal plate 103.

The sensor chip 100 has a spacer 107, a sensor diaphragm (a pressure-sensitive diaphragm) 108 that is bonded to the spacer 107, and wherein a strain is produced in response to the application of a pressure, and a sensor pedestal 109 that is bonded to the sensor diaphragm 108, and that forms a vacuum capacitance chamber (a reference chamber) 109A. Note that the vacuum capacitance chamber 109A maintains the same pressure level together with the internal space (the reference vacuum chamber) 106A of the upper housing 106, through a connecting hole, not shown, that is provided at an appropriate location of the sensor pedestal 109. Moreover, although omitted from the drawings, a movable electrode is provided on the back face (on the capacitance chamber 109A side) of the sensor diaphragm 108, and a stationary electrode is provided on the inner face of the sensor pedestal 109, facing the movable electrode.

An inlet portion 105A for the fluid to be measured is provided in the lower housing 105. Moreover, a baffle 105B is provided at the outlet, for the fluid being measured, from the inlet portion 105A of the lower housing 105 with the plate face thereof perpendicular to the direction of flow F of the fluid being measured. An inlet hole 105B1 for the fluid being measured is formed by a specific gap in the periphery of the baffle 105B. Moreover, an inlet hole 110, for directing the fluid to be measured to the sensor chip 100, is formed in the center parts of the pedestal plate 101 (102, 103) and the supporting diaphragm 104.

In this vacuum gauge, the fluid being measured (a gas) arrives at the sensor diaphragm 108 from the inlet portion 105A, and the sensor diaphragm 108 flexes due to the differential pressure between the pressure of the fluid being measured and the capacitance chamber 109A of the vacuum, changing the gap between the stationary electrode and the movable electrode that is provided between the back face of the sensor diaphragm 108 and the inner face of the sensor pedestal 109, so as to produce a change in the capacitance value (electrostatic capacitance) of the capacitor that is formed by the stationary electrode and the movable electrode. The pressure of the fluid being measured (the gas) is measured by reading out, on the outside of the vacuum gauge, the change in the electrostatic capacitance.

Moreover, when measuring the pressure, the fluid being measured (the gas) from the inlet portion 105A strikes the plate face at the center of the baffle 105B and goes around it, and passes through the inlet hole 105B1 at the periphery of the baffle 105B, to be sent to the sensor diaphragm 108 through the inlet hole 110 in the center portions of the pedestal plate 101 (102 and 103) and the supporting diaphragm 104. As a result, the fluid being measured does not strike the sensor diaphragm 108 directly, thus preventing the accumulation, on the sensor diaphragm 108, of the contaminating substances that are included in the fluid being measured.

However, while the baffle 105B is provided in the vacuum gauge, if the contaminating substance for which incursion is to be prevented is in a gaseous state at the point wherein the baffle 105B is provided, it will not be possible to completely prevent the incursion into the inside. For example, the contaminating substance incurs in a gaseous state in the thin film deposition process known as ALD (Atomic Layer Deposition), which is based on a surface adsorption reaction.

That is, the inlet hole 110 that is provided in the center portions of the pedestal plate 101 (102, 103) and the supporting diaphragm 104 is a single through hole, and there is no special structure for preventing the contaminating substance that passes through the baffle 105B in a gaseous state from arriving at the sensor diaphragm 108 within the sensor chip 100, and thus the contaminating substance easily arrives through the inlet hole 110 at the most sensitive part at the center portion of the surface of the sensor diaphragm 108. When the contaminating substance is deposited and accumulates at this part, this may cause a zero-point shift of the vacuum gauge, which would compromise the measurement accuracy.

The present invention is to solve problems such as set forth above, and an aspect thereof is to provide an electrostatic pressure sensor wherein it is possible to reduce the amount of the contaminating substances that accumulate on the pressure-sensitive diaphragm.

SUMMARY

In order to achieve such an aspect, the present invention is an electrostatic pressure sensor having a sensor chip that detects, as a change in electrostatic capacitance, a change in a pressure-sensitive diaphragm that flexes by bearing the pressure of the fluid being measured, a pedestal plate that supports the sensor chip, and a supporting diaphragm that supports the pedestal plate. The pedestal plate is made from a first pedestal plate and a second pedestal plate. The supporting diaphragm is bonded in a state wherein it is held between the first pedestal plate and the second pedestal plate. The sensor chip is supported on the top face of the center portion of the second pedestal plate. The supporting diaphragm has, in the center portion thereof, a large-diameter hole that forms a slit-shaped space between the first pedestal plate and the second pedestal plate. The first pedestal plate has at least one inlet hole, for the fluid being measured, connecting to the slit-shaped space. The second pedestal plate has an outlet hole, connecting to the slit-shaped space, which detects the fluid being measured to the pressure-sensitive diaphragm of the sensor chip. The pedestal plate has an inlet hole of the first pedestal plate and an outlet hole of the second pedestal plate do not overlap each other in the direction of thickness of the first and second pedestal plates.

In the present invention, the fluid to be measured that flows in through the inlet hole in the first pedestal plate enters into the slit-shaped space (a cavity), formed by a large diameter hole in the center portion of the supporting diaphragm, between the first pedestal plate and the second pedestal plate. The fluid to be measured that has entered into this slit-shaped space (cavity) cannot advance in the sideways direction through the slit-shaped space (cavity) because the inlet hole of the first pedestal plate and the outlet hole of the second pedestal plate are provided at positions that do not overlap in the direction of thickness of the first and second pedestal plates. This provides an opportunity for the contaminating substances that are mixed in, in a gaseous state, in the fluid to be measured to accumulate on the inner surfaces of the first and second pedestal plates. As a result, the amount of the contaminating substance that ultimately passes through the outlet hole of the second pedestal plate, to arrive at the pressure-sensitive diaphragm and to arrive at the sensor chip, is small, reducing the amount of the contaminating substance that accumulates on the pressure-sensitive diaphragm.

In the present invention, when a single inlet hole for the first pedestal plate is provided in the center portion of the first pedestal plate, and a plurality of outlet holes for the second pedestal plate are provided at the peripheral portion at equal distances in the radial direction from the center of the second pedestal plate and with equal spacing in the peripheral direction, the contaminating substances that pass through the outlet holes of the second pedestal plate to ultimately arrive at the pressure-sensitive diaphragm of the sensor chip will accumulate with a good balance on the peripheral portion, away from the center portion that is the surface of the pressure-sensitive diaphragm that has the highest sensitivity. This makes it possible to avoid accumulation of the contaminating substance on the center portion of the surface of the pressure-sensitive diaphragm, thus making it possible to greatly mitigate the effect of the zero-point shift due to the accumulation of the contaminating substances on the pressure-sensitive diaphragm.

In the present invention, a large-diameter hole that forms a slit-shaped space (a cavity) between the first pedestal plate and the second pedestal plate is provided in the center of the supporting diaphragm, where at least one inlet hole for the fluid being measured is provided in the first pedestal plate connecting to the slit-shaped space (cavity), and at least one outlet hole that connects to a slit-shaped space (cavity) in the second pedestal plate, and also to the pressure-sensitive diaphragm of the sensor chip for the fluid to be measured, and the inlet hole(s) of the first pedestal plate and the outlet hole(s) of the second pedestal plate are provided at positions that do not overlap in the direction of thickness of the first and second pedestal plates, so that the fluid to be measured that flows in from the inlet hole(s) of the first pedestal plate cannot advance through the slit-shaped space (the cavity) in the sideways direction, producing opportunities for the contaminating substances that are mixed, in a gaseous state, in the fluid to be measured to accumulate on the inside surfaces of the first and second pedestal plates, making it possible to reduce the amount of the contaminating substances that ultimately passes through the outlet hole of the second pedestal plate to arrive at the pressure-sensitive diaphragm, thus enabling a reduction in the amount of the contaminating substances that accumulate on the pressure-sensitive diaphragm.

BRIEF DESCRIPTIONS OF THE DRAWINGS

DETAILED DESCRIPTION

Figure 1:
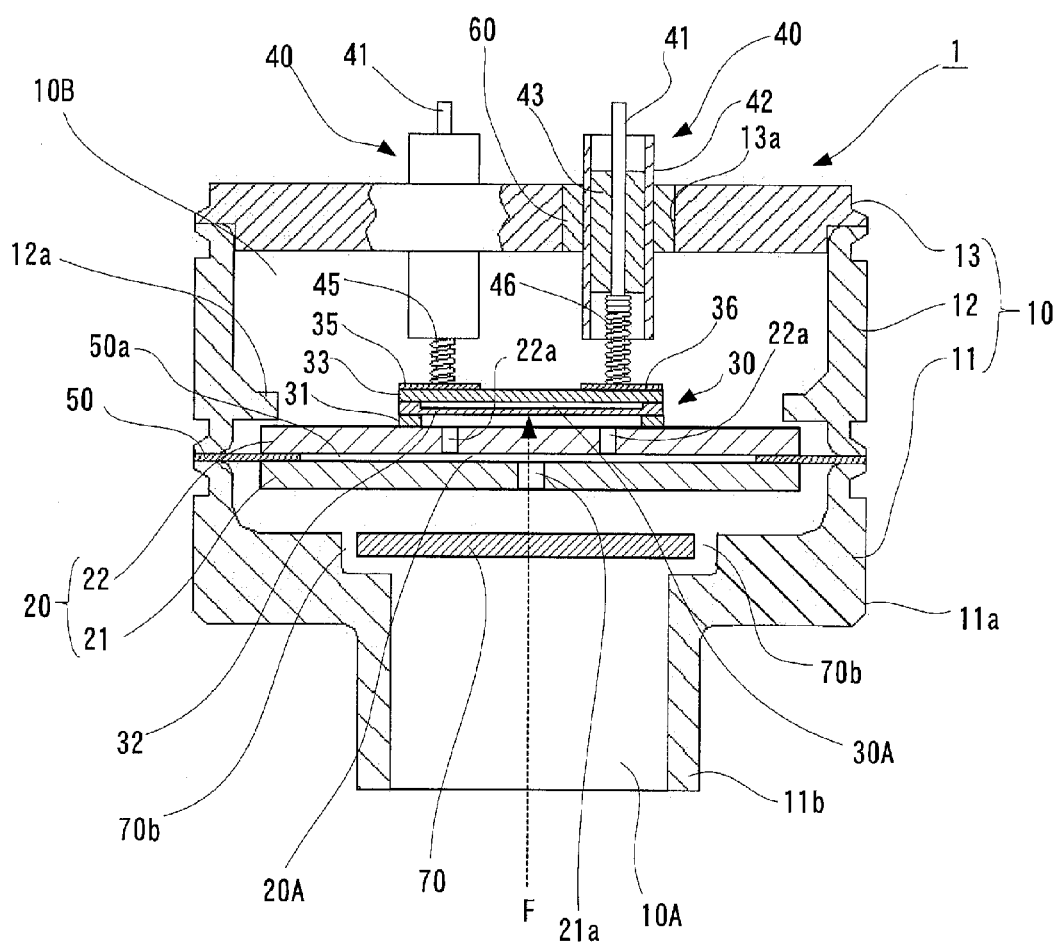
FIG. 1 is a vertical sectional diagram illustrating an example of an electrostatic pressure sensor according to the present invention (a vacuum gauge).

The present invention will be explained in detail below based on the drawings. FIG. 1 is a vertical sectional diagram illustrating an example of an electrostatic pressure sensor according to the present invention (a vacuum gauge).

The vacuum gauge 1 includes a package 10, a pedestal plate 20 that is contained within the package 10, a sensor chip 30 that is connected to the pedestal plate 20, similarly within the package 10, and an electrode lead portion 40 that connects conductively to the outside of the package 10, connected directly to the package 10. Moreover, the pedestal plate 20 is structured from a first pedestal plate 21 and a second pedestal plate 22, separated from the package 10, supported on the package 10 only through a support diaphragm 50.

The package 10 is structured from a lower housing 11, an upper housing 12, and a cover 13. Note that the lower housing 11, the upper housing 12, and the cover 13 are made from Inconel, which is a corrosion-resistant metal, and each is bonded through welding.

The lower housing 11 is provided with a shape that connects cylindrical members having different diameters, where a large diameter portion 11a thereof has a portion that connects to a support diaphragm 50, and a small diameter portion 11b thereof forms a inlet portion 10A into which the fluid to be measured flows.

The upper housing 12 has an essentially cylindrical shape, and forms a reference vacuum chamber 10B for an independent vacuum within the package 10, through the cover 13, the support diaphragm 50, the pedestal plate 20, and the sensor chip 30. Note that a gas adsorbing substance, known as a getter (not shown), is disposed in the reference vacuum chamber 10B, to maintain the vacuum level.

Moreover, a stopper 12a is formed protruding at an appropriate location in the circumferential direction on the side of the upper housing 12 wherein the support diaphragm 50 is attached. Note that this stopper 12a fulfills the role of suppressing excessive dislocation of the pedestal plate 20 due to sudden increases in pressure of the fluid to be measured.

Moreover, the cover 13 is made from a disk-shaped plate, where electrode lead through holes 13a are formed in specific locations of the cover 13, and electrode lead portions 40 are embedded through a hermetic seal 60, to ensure sealing of this part.

On the other hand, the supporting diaphragm 50 is made from a thin plate of Inconel that has an external shape that matches the shape of the package 10, and the outer peripheral portion (the peripheral edge portion) is bonded, through welding, or the like, held between the edge portions of the upper housing 12 and the lower housing 11, in a state wherein it is held between the first pedestal plate 21 and the second pedestal plate 22. The thickness of the support diaphragm 50 is, in the case of the present form of example, for example, several tens of micrometers, and is sufficiently thinner than each of the pedestal plates 21 and 22. Moreover, a large diameter hole 50a that forms a slit-shaped space (cavity) 20A is formed between the first pedestal plate 21 and the second pedestal plate 22, in the center portion of the supporting diaphragm 50.

The first pedestal plate 21 and the second pedestal plate 22 are made from sapphire, which is single-crystal aluminum oxide, where the first pedestal plate 21 is bonded to the bottom face of the supporting diaphragm 50 in a state that is away from the inner face of the package 10, and the second pedestal plate 22 is bonded to the top face of the supporting diaphragm 50 in a state that is away from the inner face of the package 10.

Moreover, in the first pedestal plate 21, an inlet hole 21a for the fluid being measured is formed in the center portion thereof connecting to the slit-shaped space (cavity) 20A, and a plurality (which, in the present example, is 4) of outlet holes 22a, that are connected to the slit-shaped space (cavity) 20A and that outlet to the sensor diaphragm 32 of the sensor chip 30, are formed in the second pedestal plate 22.

Figure 3:
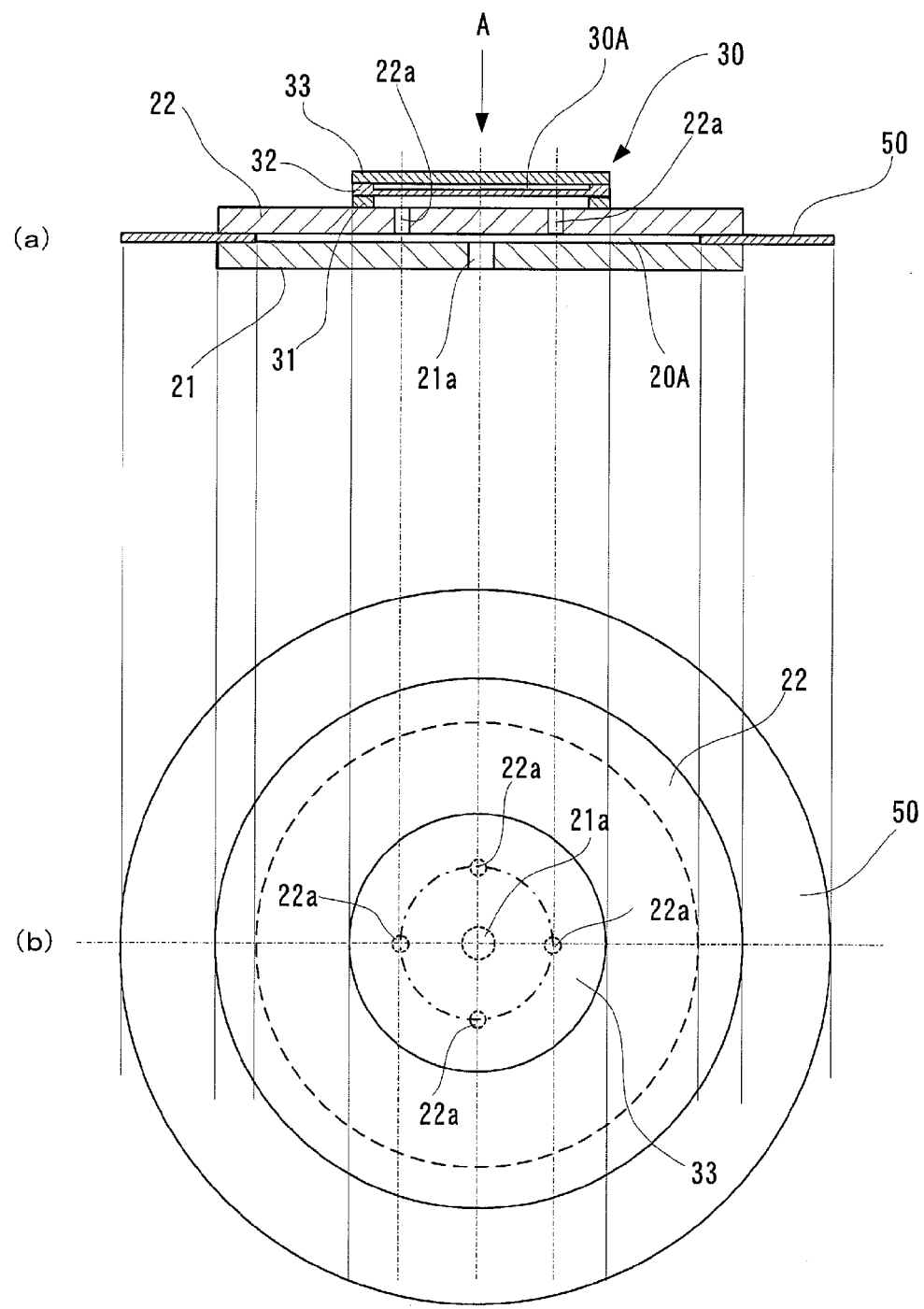
FIG. 3 is a diagram illustrating the positional relationship between the inlet hole that is formed in the first pedestal plate in the vacuum gauge and the outlet hole that is formed in the second pedestal plate.

FIG. 3 is a diagram illustrating the positional relationship between the inlet hole 21a that is formed in the first pedestal plate 21 and the outlet hole 22a that is formed in the second pedestal plate 22. FIG. 3(a) is a diagram (a vertical sectional diagram) illustrating the critical portions extracted from FIG. 1, and FIG. 3(b) is a plan view diagram where FIG. 3(a) is viewed from the direction of the arrow A. As illustrated in FIG. 3, the inlet hole 21a of the first pedestal plate 21 and the outlet holes 22a of the second pedestal plate 22 are provided at locations that do not overlap in the direction of thickness of the first pedestal plate 21 and the second pedestal plate 22. In this example, a single inlet hole 21a is formed in the center of the first pedestal plate 21, and four outlet holes 22a are provided in the peripheral portion of the second pedestal plate 22, at equal distances in the radial direction from the center of the second pedestal plate 22, with equal spacing in the peripheral direction.

Note that the individual pedestal plates 21 and 22 are adequately thick, as described above, relative to the thickness of the supporting diaphragm 50, and are structured so as to hold the support diaphragm 50 in a so-called "sandwich shape" between the two pedestal plates 21 and 22. Doing so prevents warping of this part due to thermal stresses that are produced through a difference in the coefficients of thermal expansion of the pedestal plate 20 and the support diaphragm 50.

Additionally, the sensor chip 30, made from sapphire, which is a single-crystal aluminum oxide crystal, and having a square shape when viewed from above, is bonded to the top face of the second pedestal plate 22, through a bonding material of an aluminum oxide base. Note that the method for bonding the sensor chip 30 is explained in detail in Japanese Unexamined Patent Application Publication 2002-111011 ("the JP '011"), and thus the explanation is omitted here.

The sensor chip 30 includes a spacer 31, made out of a thin plate that has a square shape, when viewed from above, with a size of no more than 1 cm$^2$, a sensor diaphragm (a pressure-sensitive diaphragm) 32 wherein a deformation occurs in accordance with the application of a pressure, bonded to the spacer 31, and a sensor pedestal 33 that forms a vacuum capacitor chamber (a reference chamber) 30A through being bonded to the sensor diaphragm 32. Additionally, the vacuum capacitance chamber 30A for the vacuum and the reference vacuum chamber 10B maintain identical vacuum levels for both through a connecting hole, not shown, penetrating through an appropriate location of the sensor pedestal 33.

Note that the spacer 31, the sensor diaphragm 32, and the sensor pedestal 33 are bonded to each other through so-called direct bonding, to structure an integrated sensor chip 30.

Moreover, stationary electrodes (not shown) are formed out of a conductor such as gold or platinum, or the like, on the inner face of the sensor pedestal 33, and movable electrodes (not shown) are formed out of a conductor such as gold, platinum, or the like, on the inner face (back face) of the sensor diaphragm 32, which faces the stationary electrodes, in the capacitance chamber 30A of the sensor chip 30. Moreover, contact pads 35 and 36 are formed from gold or platinum on the top face of the sensor chip 30, and the stationary electrodes and the movable electrodes are connected by interconnections, not shown, to the contact pads 35 and 36 within the capacitor chamber 30A.

On the other hand, the electrode lead portions 40 are provided with electrode lead pins 41 and metal shields 42, where the electrode lead pins 41 are embedded in the center part through hermetic sealing 43, made from an insulating material such as glass, on the metal shield 42, to maintain an airtight state between the two end portions of each electrode lead pin 41. Additionally, one end of each electrode lead pin 41 is exposed to the outside of the package 10, and the output of the vacuum gauge 1 propagates to an external signal processing portion through an interconnection, not shown. Note that, as described above, the hermetic seal 43 is interposed between the shield 42 and the cover 13. Contact springs 45 and 46, which are electrically conductive, are connected to the other end of the electrode lead pin 41.

The contact springs 45 and 46 have adequate flexibility so that even if the support diaphragm 50 were to be dislocated slightly through a violent increase in pressure through a sudden inflow of the fluid to be measured from the inlet portion 10A, still the biasing force of the contact springs 45 and 46 would prevent a negative impact on the measurement accuracy of the sensor chip 30.

Figure 2:
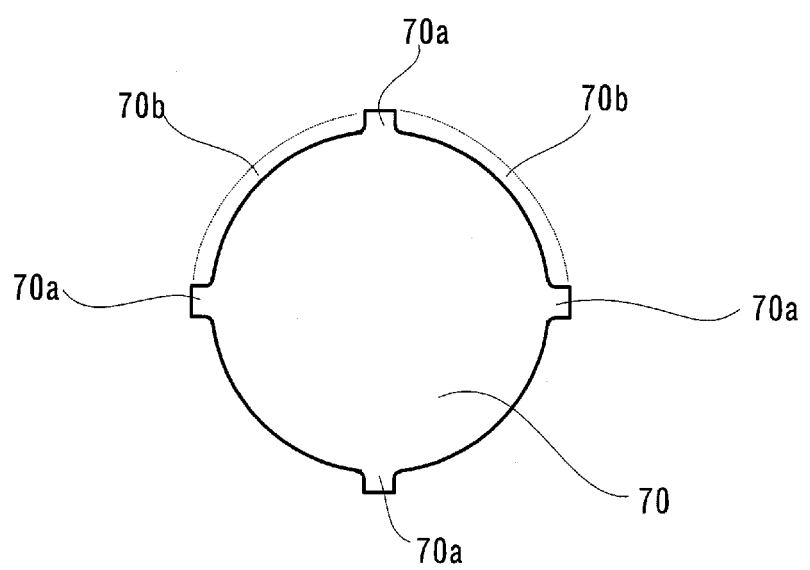
FIG. 2 is a plan view diagram of a baffle used in the vacuum gauge.

In this vacuum gauge 1, a baffle 70, made from Inconel, is disposed between the sensor diaphragm 32 of the sensor chip 30 and the inlet portion 10A, at the outlet for the fluid to be measured from the inlet portion 10A, with a plate face thereof perpendicular to the direction F in which the fluid to be measured passes therethrough. A plan view diagram of the baffle 70 is shown in FIG. 2. Tabs 70a are formed with a specific angular spacing in the outer peripheral portion of the baffle 70, and the fluid to be measured passes through the gaps 70b between the tabs 70a, to be sent to the sensor diaphragm 32.

The operation of this vacuum gauge 1 will be explained next. Note that in the present example, the vacuum gauge 1 is attached to the necessary location in an ALD film depositing device.

Measuring the Pressure of the Fluid

In this vacuum gauge 1, the fluid being measured (a gas) arrives at the sensor diaphragm 32 from the inlet portion 10A, and the sensor diaphragm 32 flexes due to the differential pressure between the pressure of the fluid being measured and the capacitance chamber 30A of the vacuum, changing the gap between the stationary electrode and the movable electrode that is provided between the back face of the sensor diaphragm 32 and the inner face of the sensor pedestal 33, so as to produce a change in the capacitance value (electrostatic capacitance) of the capacitor that is formed by the stationary electrode and the movable electrode. The pressure of the fluid being measured is measured by reading out, on the outside of the vacuum gauge 1, the change in the electrostatic capacitance.

Preventing Accumulation of the Contaminating Substances

Moreover, when measuring the pressure, the fluid being measured (the gas) from the inlet portion 10A strikes the center of the plate face of the baffle 70 and goes around it, and passes through the inlet hole gap 70b at the periphery of the baffle 70, to flow into the slit-shaped space (cavity) 20A between the first pedestal plate 21 and the second pedestal plate 22 from the inlet hole 21a of the first pedestal plate 21.

The fluid to be measured that has flowed into this slit-shaped space (cavity) 20A cannot advance in the sideways direction through the slit-shaped space (cavity) 20A because the inlet hole 21a of the first pedestal plate 21 and the outlet hole 22a of the second pedestal plate 22 are provided at positions that do not overlap in the direction of thickness of the first pedestal plate 21 and the second pedestal plate 22.

When progressing in the crosswise direction through the slit-shaped space (cavity) 20A, this produces an opportunity for the contaminating substances, in a gaseous state, that are mixed into the fluid to be measured to be deposited onto the inside surfaces of the first pedestal plate 21 and the second pedestal plate 22. As a result, the amount of the contaminating substance that ultimately passes through the outlet hole 22a of the second pedestal plate 22, to arrive at the sensor diaphragm 32 of the sensor chip 30 in a gaseous state, is small, reducing the amount of the contaminating substance that accumulates on the sensor diaphragm 32.

Moreover, in the present example, an inlet hole 21a is provided in the center portion of the first pedestal plate 21, and a plurality of outlet holes 22a for the second pedestal plate 22 are provided at the peripheral portion at equal distances in the radial direction from the center of the second pedestal plate 22 and with equal spacing in the peripheral direction, so the contaminating substances that pass through the outlet holes 22a of the second pedestal plate 22 to ultimately arrive at the sensor diaphragm 32 of the sensor chip 30 will accumulate with a good balance on the peripheral portion, away from the center portion that is the surface of the sensor diaphragm 32 that has the highest sensitivity. This makes it possible to avoid accumulation of the contaminating substance on the center portion of the surface of the sensor diaphragm 32, thus making it possible to greatly mitigate the effect of the zero-point shift due to the accumulation of the contaminating substances on the sensor diaphragm 32.

Figure 4:
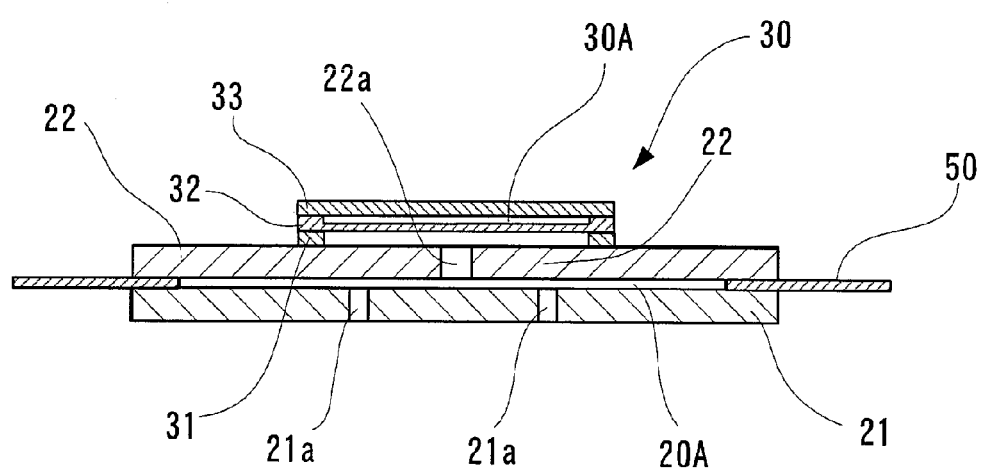
FIG. 4 is a diagram illustrating another example of an inlet hole that is formed in the first pedestal plate and the outlet holes that are formed in the second pedestal plate.
Figure 5:
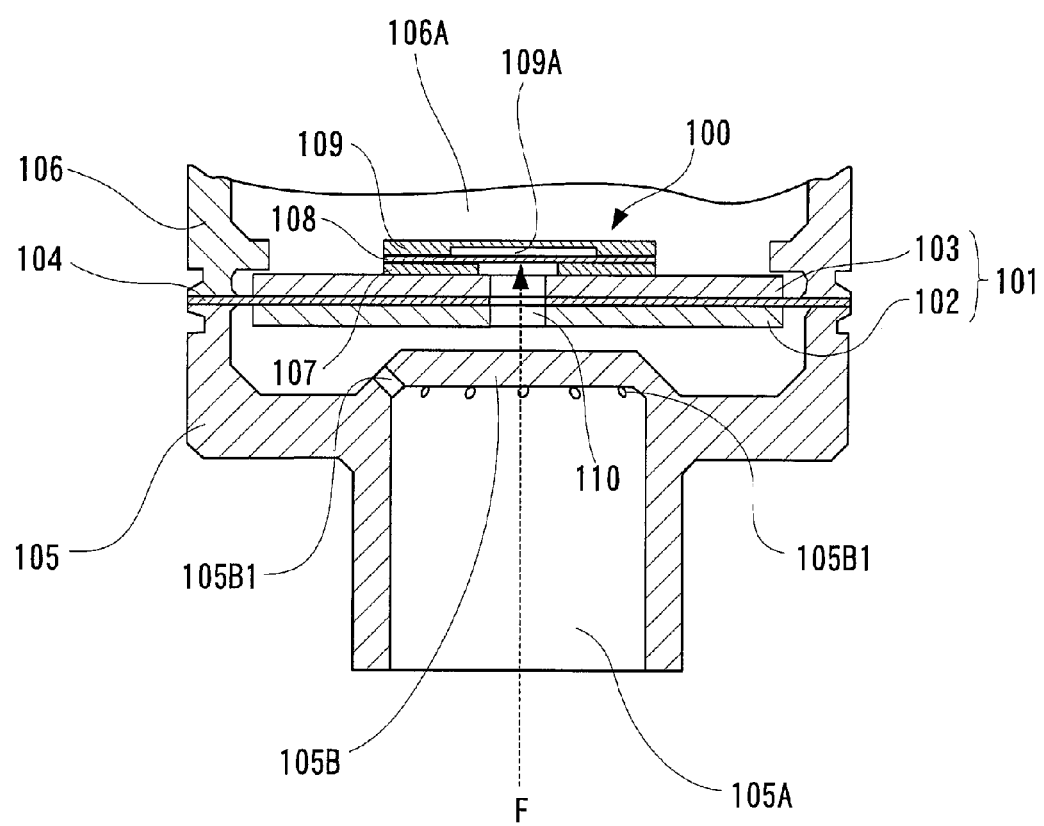
FIG. 5 is a diagram illustrating the critical portions of the vacuum gauge presented in the JP '234.

Note that while in the example set forth above, a single inlet hole 21a was provided in the center portion of the first pedestal plate 21 and a plurality of outlet holes 22a are provided in the peripheral portion of the second pedestal plate 22, instead, as illustrated in FIG. 4, a plurality of inlet holes 21a may be provided in the peripheral portion of the first pedestal plate 21, and a single outlet hole 22a may be provided in the center portion of the second pedestal plate 22. In this case, the inlet holes 21a of the first pedestal plate 21, and the outlet hole 22a of the second pedestal plate 22 are provided in locations that do not overlap in the direction of thickness of the first pedestal plate 21 and the second pedestal plate 22.

Moreover, in FIG. 3, there is no limitation to a single inlet hole 21a that is provided in the center portion of the first pedestal plate 21, but rather there may be a plurality thereof. Moreover, it is no limitation to the number of outlet holes 22a provided in the second pedestal plate 22 being 4.

Similarly, in FIG. 4, there is no limitation to a single outlet hole 22a that is provided in the center portion of the second pedestal plate 22, but rather there may be a plurality thereof. Moreover, it is no limitation to the number of inlet holes 21a provided in the first pedestal plate 21 being 4.

When the structure in FIG. 3 and the structure in FIG. 4 are compared, the structure in FIG. 3 is, of course, the better one because the contaminating substances accumulate with good balance on the outer peripheral portion away from the center of the surface of the sensor diaphragm 32 that has the highest sensitivity, as described above.

Extended Examples

While the present invention was explained above referencing examples, the present invention is not limited to the examples set forth above. The structures and details in the present invention may be varied in a variety of ways, as can be understood by one skilled in the art, within the scope of technology in the present invention.

The invention claimed is:
1. An electrostatic pressure sensor comprising:
 a sensor chip that detects, as a change in electrostatic capacitance, a change in a pressure-sensitive diaphragm that flexes by bearing a pressure of the fluid being measured;
 a pedestal plate that supports the sensor chip; and
 a supporting diaphragm that supports the pedestal plate, wherein
 the pedestal plate is made from a first pedestal plate and a second pedestal plate,
 the supporting diaphragm is bonded in a state wherein it is held between the first pedestal plate and the second pedestal plate,
 the sensor chip is supported on the top face of the center portion of the second pedestal plate,
 the supporting diaphragm has,
  in the center portion thereof, a large-diameter hole that forms a slit-shaped space between the first pedestal plate and the second pedestal plate,
 the first pedestal plate has,
  a single inlet hole, for the fluid being measured, connecting to the slit-shaped space, and provided in a center portion of the first pedestal plate,
 the second pedestal plate has
  a plurality of outlet holes, connecting to the slit-shaped space, directing the fluid being measured to the pressure-sensitive diaphragm of the sensor chip, and provided in the peripheral portion thereof at equal dis- tances in the radial direction from the center thereof and with equal spacing in the peripheral direction, and wherein the inlet hole of the first pedestal plate and the outlet holes of the second pedestal plate do not overlap in the direction of thickness of the first and second pedestal plates.

* * * * *